United States Patent
Sugiyama

(10) Patent No.: US 10,459,175 B2
(45) Date of Patent: Oct. 29, 2019

(54) OPTICAL DEVICE, AND OPTICAL COMMUNICATION MODULE USING THE SAME

(71) Applicant: Fujitsu Optical Components Limited, Kawasaki-shi, Kanagawa (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 16/282,655

(22) Filed: Feb. 22, 2019

(65) Prior Publication Data

US 2019/0285815 A1    Sep. 19, 2019

(30) Foreign Application Priority Data

Mar. 13, 2018    (JP) .................................. 2018-045016

(51) Int. Cl.
  *G02B 6/42*    (2006.01)
  *H04B 10/61*    (2013.01)
  (Continued)

(52) U.S. Cl.
  CPC ......... *G02B 6/4213* (2013.01); *G02B 6/4274* (2013.01); *G02B 6/4292* (2013.01);
  (Continued)

(58) Field of Classification Search
  CPC .. G02B 6/4213; G02B 6/4292; G02B 6/4274; H04B 10/614; H04B 10/516; H04B 10/40
  See application file for complete search history.

(56) References Cited

U.S. PATENT DOCUMENTS

| | | | |
|---|---|---|---|
| 7,187,814 B2 * | 3/2007 | Noguchi | ................. G02F 1/125 385/16 |
| 9,020,367 B2 * | 4/2015 | Jones | .................... H04L 27/223 398/208 |

(Continued)

FOREIGN PATENT DOCUMENTS

| | | |
|---|---|---|
| JP | 2011-199687 | 10/2011 |
| JP | 2015-79092 | 4/2015 |

OTHER PUBLICATIONS

Patent Abstracts of Japan English abstract for Japanese Patent Publication No. 2015-79092, published Apr. 23, 2015.

(Continued)

*Primary Examiner* — Ryan A Lepisto
(74) *Attorney, Agent, or Firm* — Staas & Halsey LLP

(57) ABSTRACT

An optical device has a photonic IC having a modulator block and a photodetector block for transmitting and receiving optical signals via multiple channels, and a wiring board to transmit and receive electrical signals to and from the photonic IC, multiple electrical wirings formed on the wiring board being associated with the multiple channels, wherein the photonic IC has a first optical waveguide set extending from an output end of the modulator block to an output port of the photonic IC and a second optical waveguide set extending from an input port of the photonic IC to an input end of the photodetector block, the optical waveguides are arranged in the shortest paths for the respective channels in the first and the second optical waveguide sets, and the lengths of the electrical wirings are set so as to compensate for a difference in optical waveguide length among the channels.

9 Claims, 8 Drawing Sheets

(51) Int. Cl.
*H04B 10/516* (2013.01)
*H04B 10/40* (2013.01)

(52) U.S. Cl.
CPC ........... *H04B 10/40* (2013.01); *H04B 10/516* (2013.01); *H04B 10/614* (2013.01)

(56) References Cited

U.S. PATENT DOCUMENTS

| | | | |
|---|---|---|---|
| 9,081,253 B2* | 7/2015 | Kono | G02F 1/225 |
| 10,110,318 B2* | 10/2018 | Streshinsky | G02B 6/4266 |
| 2007/0003184 A1 | 1/2007 | Takahara et al. | |
| 2011/0229127 A1 | 9/2011 | Sakamoto et al. | |
| 2015/0104177 A1 | 4/2015 | Kato et al. | |
| 2016/0248521 A1 | 8/2016 | Streshinsky et al. | |

OTHER PUBLICATIONS

Patent Abstracts of Japan English abstract for Japanese Patent Publication No. 2011-199687, published Oct. 6, 2011.

\* cited by examiner

OPTICAL DEVICE, AND OPTICAL COMMUNICATION MODULE USING THE SAME

CROSS-REFERENCE TO RELATED APPLICATIONS

This application is based upon and claims priority to earlier filed Japanese Patent Application No. 2018-045016 filed Mar. 13, 2018, which is incorporated herein by reference in its entirety.

FIELD

The present invention relates to an optical device for optical communication and an optical communication module using such an optical device.

BACKGROUND

Due to global spread of information and telecommunication devices such as smartphones and progress in the Internet of Things (IoT), demand for high-capacity optical transmission technology is increasing. On the transmitter side, high-capacity transmission is being achieved by multi-level optical modulation and wavelength division multiplexing (WDM) schemes. On the receiver side, coherent optical transmission designed for coherent detection of optical signals associated with digital signal processing is a key technology for high-speed high-capacity optical communication.

In general, an optical transmitter (Tx) has an optical modulator and a driver for driving the optical modulator, and an integrated coherent receiver (ICR) is provided as an optical receiver (Rx). The modulator package size becomes large as the number of modulation levels or the number of multiplexed wavelengths increases. The same applies to the receiving-end ICR package.

With a configuration of either as separate chips or packaged driver, modulator, and ICR, mounted on a print circuit board, the size of the optical transceiver module would increase. The optical transceiver module size can be reduced by integrating the optical modulator and the ICR on the same photonic integrated circuit (IC), and then incorporating the photonic IC and a driver formed as an electric or electronic circuit into the same package.

In optical transmission using multiple channels for improving the transmission rate, radio frequency (RF) signals input to the optical transmitter are regulated such that the output timings of optical signals to be generated are in alignment with each other between the channels. The optical signals received at the optical receiver are also regulated such that the output timings of the optical-to-electrical converted RF signals are in alignment with each other between the channels. With this configuration, a skew between the channels is minimized on both the transmitter side and the receiver side.

One known technique is compensating for a skew between optical signal channels by adjusting the length of the electrical wirings. See, for example, patent documents 1 to 3.

PRIOR ART DOCUMENT LIST

Patent Document 1: Japanese Patent Application Laid-open No. 2015-79092

Patent Document 2: US Patent Application Publication No. 2016/0248521

Patent Document 3: US Patent Application Publication No. 2007/0003184

Patent Document 4: Japanese Patent Application Laid-open No. 2011-199687

SUMMARY

According to one aspect of the invention, an optical device has a photonic integrated circuit having a modulator block and a photodetector block for transmitting and receiving optical signals via multiple channels, and a wiring board configured to transmit and receive electrical signals to and from the photonic integrated circuit, multiple electrical wirings formed on the wiring board being associated with the multiple channels, wherein the photonic integrated circuit has a first optical waveguide set extending from an output end of the modulator block to an output port of the photonic integrated circuit, and a second optical waveguide set extending from an input port of the photonic integrated circuit to an input end of the photodetector block, wherein in the first optical waveguide set and the second optical waveguide set, each of optical waveguides is provided in a shortest path for each of the multiple channels, and, wherein lengths of the multiple electrical wirings are set so as to compensate for a difference in optical waveguide length among the multiple channels.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

Figure 1:
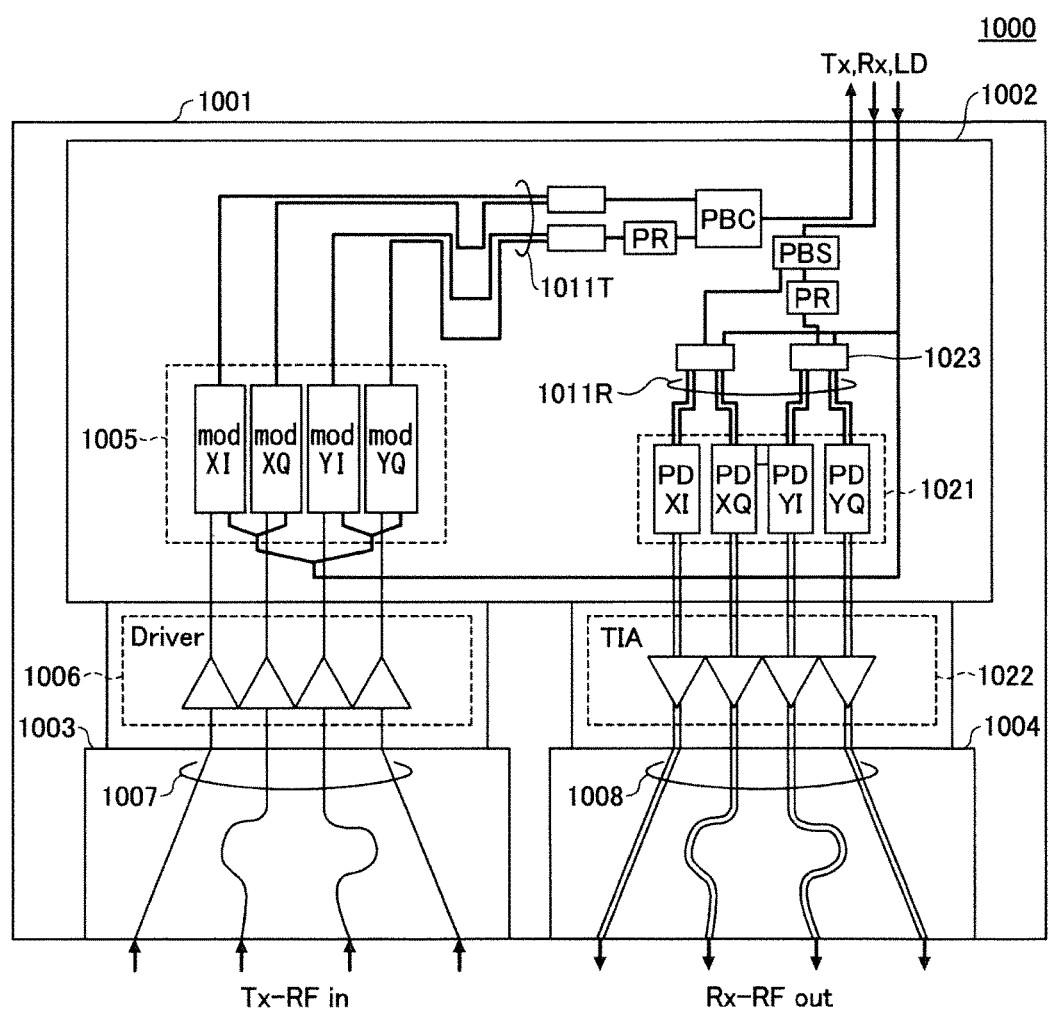
FIG. 1 is a diagram for explaining a technical problem arising in a conventional structure.

Prior to describing the embodiments of the invention, a technical problem arising in a conventional structure, which is found by the inventor, is explained. FIG. 1 illustrates a skew adjustment performed in a configuration with a photonic IC 1002 and an electric circuit (including a driver 1006 and a transimpedance amplifier (TIA) 1022) arranged in the same package 1001. The lengths of the RF electrodes 1007 formed on an interposer board 1003 for supplying electrical signals to the driver 1006 are all equal among the channels. On an interposer board 1004 provided to take the output signals of the TIA 1022 out of the package 1001, the lengths of the RF electrodes 1008 are also equal among the channels. Furthermore, in the photonic IC 1002, the length of the optical waveguide set 1011T extending from the output end of the modulator block 1005 to the output port of the transmitter (Tx) is equal among the channels. The length of the optical waveguide set 1011R extending from the input port of the optical receiver (Rx) to the input end of the photodetector block 1021 is also equal among the channels. The timings of the electric signals passing through the RF electrodes 1007 are aligned between the channels, and the timings of the optical signals travelling through the optical waveguide set 1011T are aligned between the channels. Similarly, the timings of the optical signals travelling through the optical waveguide set 1011R are aligned between the channels, and the timings of the electric signals passing through the RF electrodes 1008 are aligned between the channels. This configuration may minimize the skew.

To make the lengths of the optical waveguides equal among the plurality of channels on the photonic IC 1002, the longest channel is used as the reference and the lengths of the other channels are brought into agreement with the longest channel length in the optical waveguide set 1011T and the optical waveguide set 1011R. Depending on the channels, some optical waveguides may become longer than the shortest path layout.

In a configuration using spatially arranged optical components or a planar lightwave circuit (PLC), little propagation loss occurs or the quantity of propagation loss may be very small. Even though the optical path is lengthened, excess loss will hardly occur. In contrast, however, a light beam travelling through a silicon photonic waveguide is subjected to propagation loss. As the length of the optical waveguide increases, more excess loss arises and consequently, the output power (Tx-output) of the optical transmitter and the RF signal output level (Rx-output) from optical receiver decrease.

To overcome this technical problem, in the embodiment, each of multiple channels is connected in the shortest path for all paths between the modulator block and the output port or all paths between the input port and the photodetector block. Due to the shortest layout of the optical waveguides of the respective channels, the waveguide length may vary among the channels. Such difference in the waveguide length is compensated for or absorbed by adjusting the lengths of the signal wirings for transmitting and receiving electrical signals to and from the photonic IC.

Here, the term "shortest layout" does not mean connecting between the output of the modulator and the output port, or between the input port and the input of the photodetector block by the geometrically shortest straight line. The "shortest layout" means that the most efficient arrangement is employed on the waveguide layout, but no extension of optical path or no addition of delay lines for matching the timing between channels is made.

When the optical waveguide is arranged in the shortest layout in each channel (or each signal path) on the photonic IC, the length of the optical waveguide may vary among the channels. Such difference in the optical waveguide length is compensated for by adjusting the lengths of the electrical wirings. Channels with longer optical waveguides are connected to shorter signal wirings or electrodes on the wiring board. Channels with shorter optical waveguides are connected to long signal wirings or electrodes on the wiring board. The skew is adjusted by making the effective length of the optical waveguide and the total channel length of the effective length of the electrical wiring the same between the channels.

By arranging the optical waveguides in the shortest layout on the photonic IC for the respective channels, the size of the photonic IC can be reduced. For the photonic IC, the shorter the optical waveguide, the less the propagation loss is. With the optical waveguides whose lengths differ between channels based upon the shortest layout, the optical loss may also vary between channels. In this case, the coupling ratio or the decoupling ratio (i.e., the branching ratio) of optical waveguides may be adjusted so as to suppress variations in optical loss among the channels and improve the optical power level of the entirety of the optical device.

First Embodiment

Figure 2:
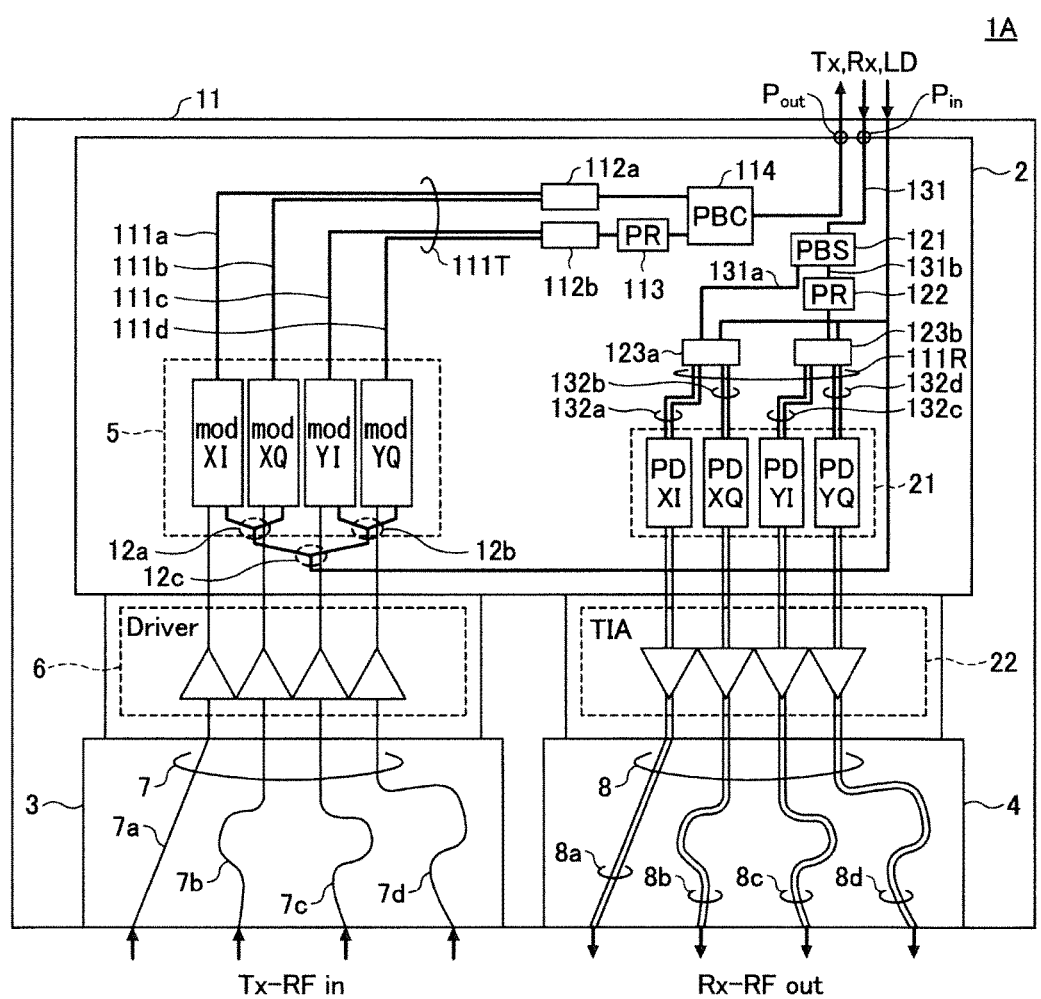
FIG. 2 illustrates a configuration example of an optical device according to the first embodiment.

FIG. 2 is a schematic diagram of an optical device 1A according to the first embodiment. In this example, the optical device 1A employs a modulation scheme of dual polarization-quadrature phase shift keying (DP-QPSK) in which two mutually orthogonal polarization components and two mutually orthogonal phase components are used to represent four logical values.

The optical device 1A is, for example, an electro-optical conversion chip used in an frontend circuit of optical communication, and it has a photonic integrated circuit 2 (hereinafter referred to as "photonic IC 2"), a driver circuit 6, a TIA circuit 22, and interposer boards 3 and 4.

The photonic IC 2 has a modulator block 5 and a photodetector block 21 monolithically formed on a substrate. The modulation block 5 includes optical modulators XI, XQ, YI, and YQ, which are driven by radio frequency (RF) signals output from associated drivers of the driver circuit 6. The light beams incident to the optical modulators from a light source such as a laser diode (LD) are modulated by the RF signals.

The light beam input to the modulator block 5 is branched into two components by the optical coupler 12*c*. The branched light beams are further branched by the optical couplers 12*a* and 12*b*, respectively, and four light components are input to the optical modulators XI, XQ, YI and YQ. Each of the optical modulators XI, XQ, YI, and YQ is formed by, for example, a Mach-Zehnder interferometer, and light beams interfered according to the voltage levels of the drive signals are output to the optical waveguides 111*a*, 111*b*, 111*c*, and 111*d*.

The optical waveguides 111*a* and 111*b* are combined by the optical coupler 112*a*. The optical waveguides 111*c* and 111*d* are combined by the optical coupler 112*b*. The plane of polarization of light output from either one of the optical coupler 112*a* or the optical coupler 112*b* is rotated by 90 degrees at the polarization rotator (PR) 113. Accordingly, the two light components become mutually orthogonal polarized waves. The two polarized waves are combined by the polarization beam combiner (PBC) 114 and output as an optical signal (Tx) to be transmitted from the output port $P_{out}$ of the photonic IC 2.

On the receiving (Rx) end, the optical signal is input to the photonic IC 2 through the input port $P_{in}$ and separated into two polarized light components by the polarization beam splitter (PBS) 121. After the plane of polarization of one of the split light components is rotated by 90 degrees by the polarization rotator (PR) 122, the two light components are input to the 90° hybrid optical mixers 123*a* and 123*b*, respectively.

A portion of the light output from the LD is used as a local-oscillator (LO) wave and supplied to the 90° hybrid optical mixers 123*a* and 123*b*. At each of the optical mixers 123*a* and 123*b*, the signal light interferes with the local-oscillator wave and four light components with the optical phases shifted by 90 degrees from one another are output. These four light components are detected by the photodetector block 21.

The photodetector block 21 includes photodetectors PDXI, PDXQ, PDYI, and PDYQ. The photodetectors PDXI, PDXQ, PDYI, and PDYQ are, for example, balanced photodetectors, and four pairs of differential photocurrents are output from the photodetector block 21. The differential photo currents are converted into electrical voltage signals by the TIA circuit 22 and differential signals are outputted.

The differential signals are taken out of the optical device 1A via differential signal wirings 8*a* to 8*d* formed on the interposer board 4.

One of the features of the embodiment is that the optical waveguide set 111T extending from the modulator block 5 to the output port $P_{out}$ is arranged in the shortest layout for each channel (or each signal path). Similarly, the optical waveguide set 111R extending from the input port $P_{in}$ to the photodetector block 21 is arranged in the shortest layout for each channel (or each signal path). At the receiving side, the optical waveguide set 111R includes an optical waveguide 131 extending from the input port $P_{in}$ to the PBS 121, optical waveguides 131*a* and 131*b* extending from the PBS 121 to the 90° hybrid optical mixers 123*a* and 123*b*, and four pairs of optical waveguides 132*a* to 132*d* extending from the 90° hybrid optical mixers 123*a* and 123*b* to the photodetector block 21.

Since the optical waveguide set 111T and the optical waveguide set 111R are arranged in the shortest layout for each channel, the layout design of the photonic IC 2 is simplified and the chip size is reduced. For the photonic IC 2 fabricated by silicon photonics technology, if delay paths are provided for the respective channels to eliminate the skew among the channels, optical loss arises and output power level will lowers. By using the photonic IC 2 with the shortest layout of the optical waveguides as in the embodiment, the optical loss is minimized in each of the channels.

However, because of the shortest layout of the optical waveguide set 111T and the optical waveguide set 111R for each of the channels, time delay difference (or skew) occurs among the channels. To compensate for the skew in the photonic IC 2, the lengths of the electric signal wirings are adjusted so as to bring the effective channel lengths to be the same.

In particular, the lengths of the signal wirings (or the RF electrodes) 7*a* to 7*d* formed on the interposer board 3 and connected to the inputs of the driver circuit 6 are adjusted based upon the length of the optical waveguide set 111T. Similarly, the lengths of the signal wirings (or the RF electrodes) 8*a* to 8*d* formed on the interposer board 4 and connected to the outputs of the TIA circuit 22 are adjusted based upon the length of the optical waveguide set 111R.

In the interposer board 3, the length of the electrical signal wiring 7*a* associated with the longest optical waveguide 111*a* is shortened and the electrical signal wiring 7*d* associated with the shortest optical waveguide 111*d* is lengthened. In the interposer board 4, the differential signal wiring pair 8*d* connected to the optical channel with the shortest path extending from the input port $P_{in}$ to the photodetector block 21 is designed to be the longest. The differential signal wiring pair 8*a* connected to the optical channel with the longest path extending from the input port $P_{in}$ to the photodetector block 21 is designed to be the shortest.

In the exemplified configuration FIG. 2, the center of the signal wiring array 7 is set to the center of the interposer board 3. The center of the signal wiring array 8 is set to the center of the interposer board 4. In the interposer board 3, the shortest signal wiring 7*a* is used as the reference, and the lengths of the other signal wirings 7*b* to 7*d* are increased according to the difference in the optical path length of the optical waveguide set 111T. In the interposer board 4, the shortest signal wiring pair 8*a* is used as the reference, and the lengths of the other signal wirings pairs 8*b* to 8*d* are increased according to the difference in the optical path length of the optical waveguide set 111R.

The total channel length adding the effective path length of the optical waveguide and the effective path length of the electric signal wiring becomes equal among the channels and the skew can be suppressed in the optical device 1A.

In FIG. 2, with the optical waveguide set 111T and the optical waveguide set 111R that employ in the shortest layout, the waveguide length may vary among the channels. In a photonic IC formed by silicon photonics technology and having a difference in the waveguide length among channels, the optical loss becomes greater in a longer channel than in a short channel. Besides, optical loss arises between I branch and Q branch (between optical phases) or between X-polarized wave and Y-polarized wave (between polarizations). When the quantity of optical loss differs between the I branch and the Q branch and/or between the polarized waves, the extinction ratio of the respective modulators of the modulator block 5, the polarization dependent loss, or the photodetection sensitivity balance between the X and Y branches and the I and Q branches may be degraded at the receiving end.

To avoid such degradation, the coupling ratio or the branching ratio of the optical couplers provided on the optical waveguide set 111T or the optical waveguide set 111R is shifted from the equal separation (50/50) so as to compensate for the optical loss arising in the longer channels.

For example, the coupling ratio is regulated at the optical coupler 112*a* for optically coupling the optical waveguides 111*a* and 111*b* having different lengths and at the optical coupler 112*b* for optically coupling the optical waveguides 111*c* and 111*d* having different lengths, so as to compensate for the loss of light travelling through the longer channel. Similarly, the combining ratio of the PBC 114 is regulated so as to increase the ratio of the longer optical waveguide, thereby changing the ratio of polarization dependent loss from 50/50.

The coupling ratio may be regulated by forming the optical coupler as a directional coupler or a multimode interference (MMI) coupler and adjusting the interaction length, the length of the coupler, or the like. Alternatively, the optical waveguide may be designed such that the cross-sectional area or the width of the longest optical waveguide 111*a* becomes the largest and that the cross-sectional area or the width of the shortest optical waveguide 111*d* becomes the smallest.

On the receiving side, the branching ratio of the PBS 121 and the branching ratios of the 90° hybrid optical mixers 123*a* and 123*b* are adjustable by, for example, inserting a directional coupler, an MMI coupler, etc. at the Y branch of the optical waveguide and by regulating the interaction length of the inserted coupler.

Figure 3:
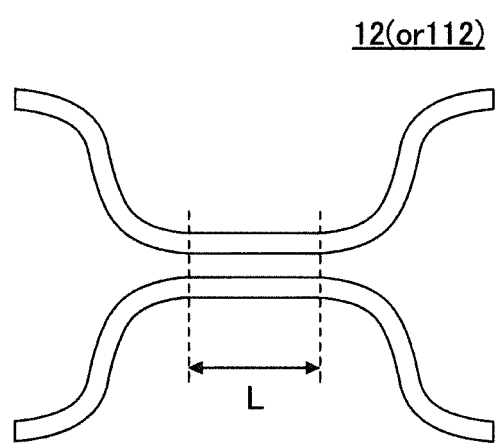
FIG. 3 is a diagram to explain adjustment of the branching ratio when using a directional coupler as a branching coupler.

FIG. 3 is a diagram for explaining adjustment of the interaction length of a directional coupler. The interaction length may be adjusted such that the branching ratio of the longer waveguide becomes greater than that of the shorter one, thereby compensating for the loss of light travelling through the longer waveguide.

Figure 4A:
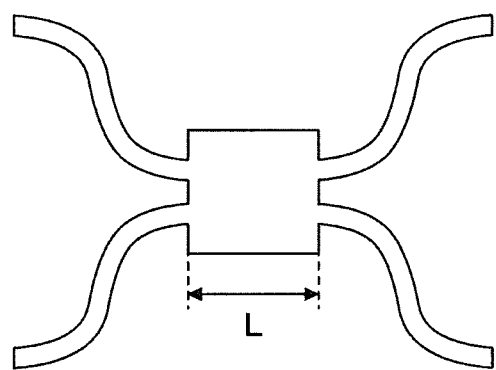
FIG. 4A is a diagram to explain adjustment of the branching ratio when using an MMI coupler as a branching coupler.
Figure 4B:
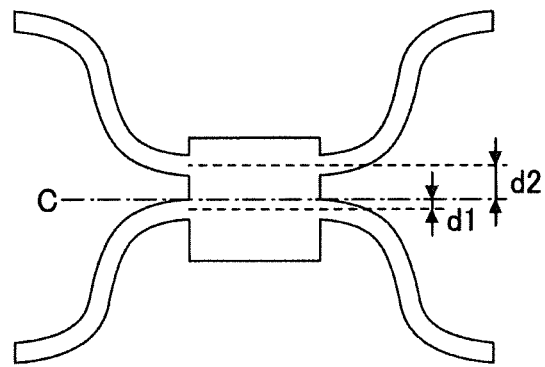
FIG. 4B is a diagram to explain adjustment of the branching ratio when using an MMI coupler as a branching coupler.
Figure 4C:
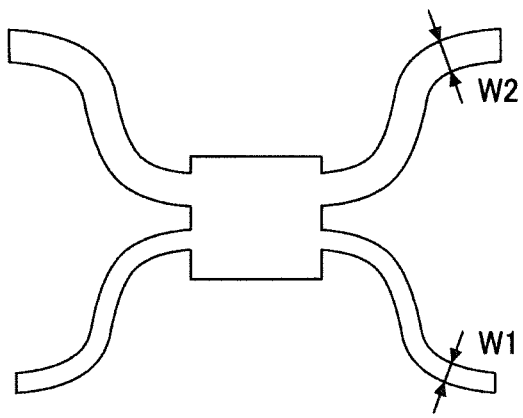
FIG. 4C is a diagram to explain adjustment of the branching ratio when using an MMI coupler as a branching coupler.

FIG. 4A to FIG. 4C are diagrams for explaining adjustment of the interaction length of a MMI coupler serving as a branching coupler. In FIG. 4A, the coupler length, i.e., the length of the MMI slab, is adjusted so as to increase the branching ratio of the longer optical waveguide. Alternatively, as illustrated in FIG. 4B, the branching ratio may be regulated by adjusting the positions d1 and d2 of the input/output waveguides with respect to the center of the slab waveguide. As illustrated in FIG. 4C, the widths w1 and w2 of the input/output waveguides of the MMI coupler may be adjusted.

By adjusting the coupling ratio or the branching ratio so as to compensate for the difference in optical waveguide length among channels, the output levels of the respective waveguides are balanced, thereby preventing the extinction ratio, the polarization dependent loss, or the light-receiving sensitivity balance between X and Y branches and between I and Q branches from degrading.

Returning to FIG. 2, since the shortest waveguide layout is employed for each channel, the propagation loss is minimized with respect to the entirety of the optical device 1A. For example, the optical waveguides 111c and 111d of the Y-polarization branch on the transmission side are made shorter as compared with the configuration of FIG. 1, and optical loss is reduced responsive to the reduction of the waveguide length. Half of the optical power relatively increased owing to the prevention of the optical loss is distributed to the X-polarization branch. Likewise, the Q-branch optical waveguides 111b and 111d are made shorter, compared with the configuration of FIG. 1, and the optical loss is suppressed in the Q branch. Half of the optical power relatively increased owing to the prevention of the optical loss is distributed to the I-branch.

The total optical power allocated between the X and Y branches and between the I and Q branches is greater than that obtained in the configuration of FIG. 1 using the optical waveguides with the equal length among the channels. The skew which may be caused due to the difference in the optical path length is compensated for by adjusting the lengths of the electric signal wiring sets 7 and 8 so as to make the total channel lengths equal among the channels.

Thus, in a compact optical device using a photonic IC, effective skew adjustment and reduction of optical loss are achieved and the output characteristic of the optical device is improved.

Second Embodiment

Figure 5:
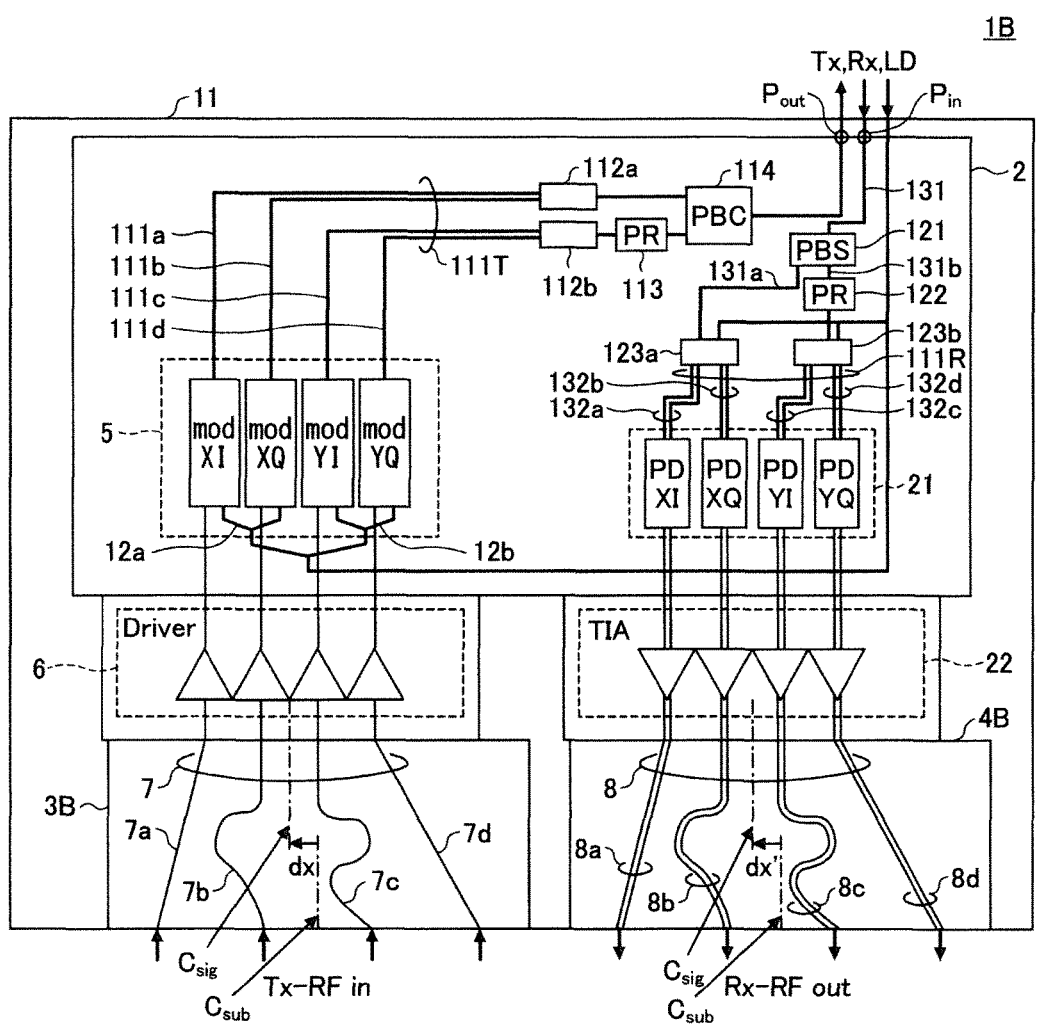
FIG. 5 illustrates a configuration example of an optical device according to the second embodiment.

FIG. 5 is a schematic diagram of an optical device 1B according to the second embodiment. The same elements as those in the first embodiment are denoted by the same symbols and redundant explanation will be omitted.

The configurations of the photonic IC 2, the driver circuit 6, and the TIA circuit 22 are the same as those of the first embodiment. That is, the optical waveguide set 111T and the optical waveguide set 111R are arranged in the shortest path layout for the respective channels, and the propagation loss as a whole in the optical device 1B is minimized. Variations in the optical loss between channels due to the difference in the lengths of the optical waveguides are compensated for by adjusting the coupling ratio or the branching ratio of the optical waveguides. Delay time difference (or the skew) due to the difference in the optical path length is compensated for by adjusting the lengths of the electrical signal wirings.

In the second embodiment, the layout design of the signal wiring set 7 of the interposer board 3B and the signal wiring set 8 of the interposer board 4B is improved. In the first embodiment, the center of the signal wiring array coincides with the center axis of the substrate in the interposer boards 3 and 4. In the second embodiment, the center of the signal wiring array (namely, the center of the channels) is offset from the center axis of the substrate, thereby reducing the length of the entirety of the signal wirings.

The center $C_{sig}$ of the array of the signal wirings 7a to 7d provided on the interposer board 3B is offset from the center $C_{sub}$ of the interposer board 3B by the amount $d_x$ in the array direction. The amount of the offset is determined such that the length of the signal wiring 7a connected to the longest optical waveguide 111a becomes the minimum within the range of the wiring layout.

After the signal wiring 7a itself is made as short as possible within the range of the wiring layout, the lengths of the signal wirings of the other channels are adjusted with reference to the signal wiring 7a so as to compensate for the difference in the channel length. As a result, the lengths of the remaining signal wirings 7b to 7d are also decreased compared with the conventional configuration.

Likewise, the center $C_{sig}$ of the array of the differential signal wiring pairs 8a to 8d provided on the interposer board 4B is offset from the center $C_{sub}$ of the interposer board 4B by the amount $d_x'$ in the array direction. The amount of the offset is determined such that the length of the differential signal wiring pair 8a connected to the longest optical path (formed by the optical waveguides 131, 131a and 132a) becomes the minimum within the range of the wiring layout.

After the differential signal wiring pair 8a itself is made as short as possible within the range of the wiring layout, the lengths of the differential signal wiring pair of the other channels are adjusted with reference to the differential signal wiring pair 8a so as to compensate for the difference in the channel length. As a result, the lengths of the remaining differential signal wiring pairs 8b to 8d are also reduced, compared with the conventional configuration.

By reducing the lengths of the signal wirings 7a to 7d and the lengths of the differential signal wiring pairs 8a to 8d, propagation loss of the radio frequency (RF) signal is reduced and the transmission at that band is improved. Propagation loss is reduced in both the optical waveguides and the electrical signal lines, and the performance of the optical device is improved. In the compact optical device 1B using the photonic IC 2, effective skew adjustment and reduction of optical loss are achieved and the output characteristics of the optical device 1B is improved.

Third Embodiment

Figure 6:
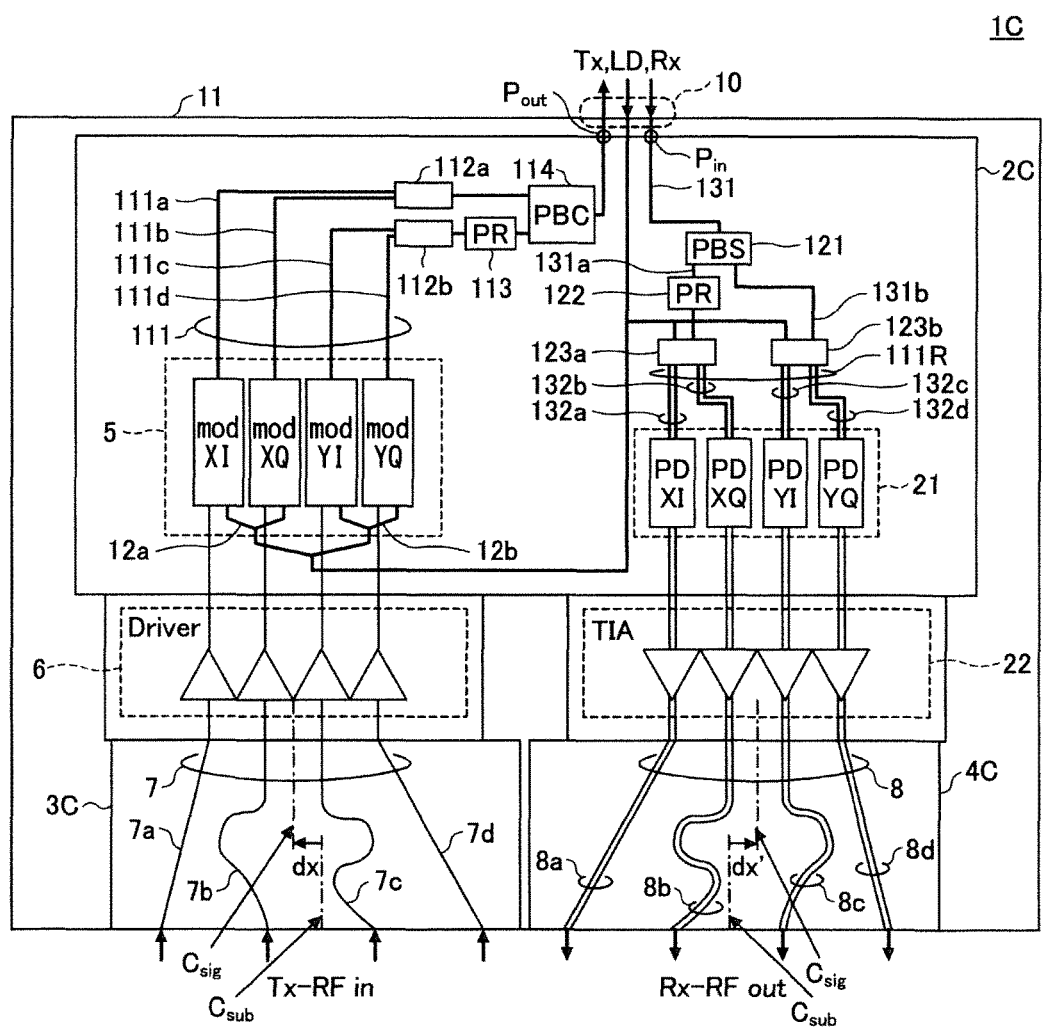
FIG. 6 illustrates a configuration example of an optical device according to the third embodiment.

FIG. 6 is a schematic diagram of an optical device 1C according to the third embodiment. The same elements as those in the first and the second embodiments are denoted by the same symbols and redundant explanation will be omitted.

In the third embodiment, a fiber connecting part 10 which includes the input port $P_{in}$ and the output port $P_{out}$ is placed near the center of an edge or an end face of the photonic IC 2. The fiber connecting part 10 may further include an LD light guiding port for introducing light from the external light source (LD) to the photonics IC 2.

Compared with the configurations of FIG. 2 and FIG. 5, the respective channels of the waveguide set 111T are arranged in the shortest layout and simultaneously, the length of the entirety of the optical waveguide set 111T is further reduced by placing the fiber connecting part 10 at or near the center of the edge of the photonic IC 2. Besides, the difference in the optical waveguide length becomes smaller among the channels. The length of the optical waveguide set 111T can be reduced as a whole at the transmission end, with little influence on the length of the optical waveguide set 111R of the receiving end.

By this change of position of the fiber connecting part 10, the optical path passing through the optical waveguides 131, 131a and 132a becomes the shortest, and the optical path passing through the optical waveguides 131, 131b and 132d becomes the longest, on the receiver side. Compared with the configurations in FIG. 2 and FIG. 5, the waveguide layout between the input port and the photodetector block 21 is merely inverted, and there is no or little influence on the length of the waveguides.

The difference in the waveguide length of the optical waveguide set 111T among the channels is compensated for by adjusting the lengths of the signal wirings 7a to 7d on the interposer board 3C. The difference in waveguide length of the optical waveguide set 111R is compensated for by adjusting the lengths of the differential signal wiring pairs 8a to 8d of the interposer board 4C. On the interposer boards 3C and 4C, the center $C_{sig}$ of the signal wiring array may be offset by a predetermined amount from the center $C_{sub}$ of the substrates, as in the second embodiment. With this arrangement, the length of the electric signal wirings is reduced as a whole, and propagation loss can be minimized in both the optical waveguides and the electrical signal wirings. Consequently, the output level of the optical device 1C can be increased.

<Modifications>

Figure 7:
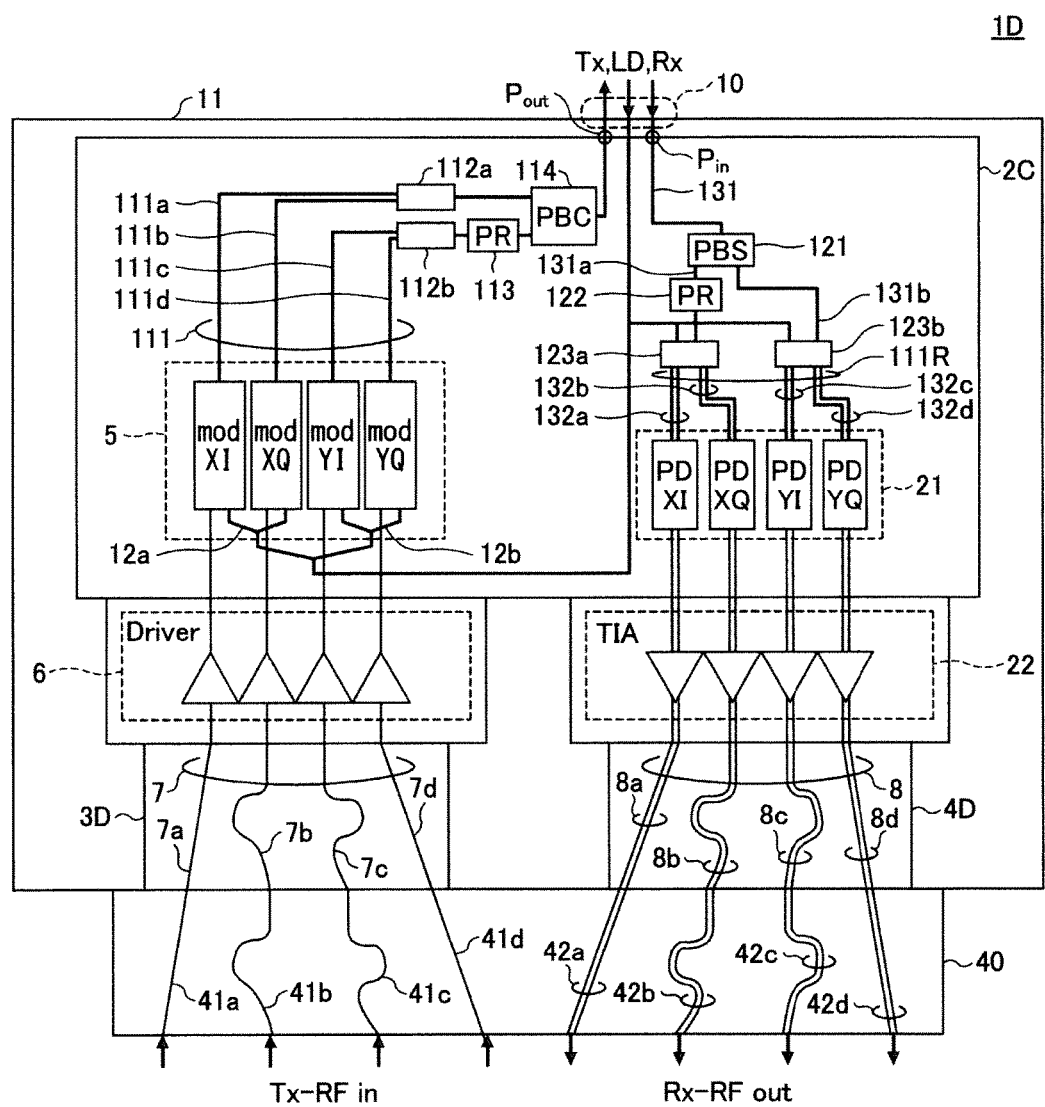
FIG. 7 illustrates a modification of the optical device.

FIG. 7 is a schematic diagram of an optical device 1D as one of modifications. The optical device 1D uses a flexible printed circuit (FPC) board 40 as an RF interface of the package 11. The signal wirings 7a to 7d of the interposer board 3D are connected to the signal wirings 41a to 41d on the FPC board 40. The differential signal wiring pairs 8a to 8d of the interposer board 4D are connected to the differential signal wiring pairs 42a to 42d on the FPC board 40.

With this configuration, the difference in waveguide length among the channels of the optical waveguide set 111T and the difference in the waveguide length among the channels of the optical waveguide set 111R are compensated for by adjusting the lengths of the signal wirings or the RF electrodes (including the differential pairs) on the FPC board 40.

The lengths of the signal wirings 7a to 7d may be the same on the interposer board 3D. The lengths of the differential signal wiring pairs 8a to 8d may be the same on the interposer board 4D. Even for the lengths of the electrical signal lines being fixed on the interposer board 3D and/or the interposer board 4D, the lengths of the electrical wirings can be adjusted on the FPC board 40. Even with the shortest layout of the optical waveguide set 111T and the optical waveguide set 111R, the total length including the optical path length and the electrical path length can be set equal among the channels.

The lengths of the electrical signal lines may be adjusted on at least one of the interposer board 3D and the FPC board 40, or at least one of the interposer board 4D and the FPC board 40, so as to compensate for the difference in the length among the channels of the optical waveguides.

<Applications to Optical Communication Module>

Figure 8:
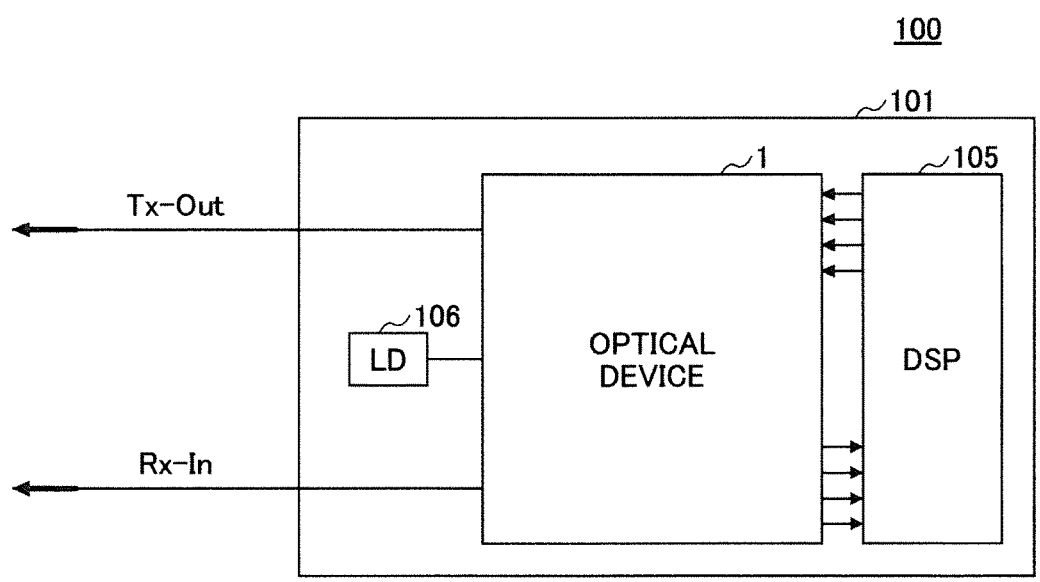
FIG. 8 is a schematic block diagram of an optical communication module using an optical device of an embodiment.

FIG. 8 is a schematic diagram of an optical communication module 100 using an optical device 1 of an embodiment. The optical communication module 100 includes the optical device 1, a light source unit (denoted as "LD" in the FIG. 106, and a signal processor (denoted as "DSP" in the FIG. 105, which are accommodated in a package 101.

Any one of the optical devices 1A to 1C of the embodiments and the optical device 10 of the modification may be used as the optical device 1. The optical device 1 is designed as a compact electro-optical converter chip, and it has the photonic IC 2, the driver circuit 6, the TIA circuit 22, and the interposer boards 3 and 4 which are accommodated in the package 11. In the optical device 1, optical waveguides are arranged in the shortest layout for the respective channels to suppress the optical loss of the device as a whole. Skew that may arise in the photonic IC 2 is compensated for by adjusting the lengths of the electric signal wirings including the differential signal pairs. Consequently, satisfactory output characteristics can be acquired.

The optical device 1 is connected to the signal processor 105 by the interposer boards 3 and 4 and the FPC board 40 if employed, via a package board. The signal processor 105 generates a digital data signal based upon data to be transmitted and supplies the digital data signal to the driver circuit 6. The driver circuit 6 generates high-frequency analog drive signals for driving the modulator block 5 based upon the digital data signal. On the receiver side, the signal processor 105 converts the analog electrical signal output from the optical device 1 into a digital signal and recovers the received data signal.

The light emitted from the light source unit 106 is input to the optical device 1. A portion of the input light is guided to the modulator block of the optical device 1, and the remaining portion is supplied as local oscillator light to the 90° hybrid optical mixers 123a and 123b to detect the received optical signal components.

Because the optical device 1 is downsized using the photonic IC 2, while regulating the skew and suppressing optical loss, the optical communication module 100 is also made compact and can achieve satisfactory output performance.

The above embodiments have been described solely as examples, and various modifications and alterations may be included in the invention. The configuration of the modulator block 5 of the optical device 1 is not limited to the DP-QPSK scheme, but is also applicable to other modulation schemes such as 16-QAM, QPSK, etc., using multiple signal paths or channels formed by optical waveguides. The optical communication module 100 of the embodiment is suitable to either optical communication between servers in a data center or between data centers, or optical communication of metro networks.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical device comprising:
a photonic integrated circuit having a modulator block and a photodetector block for transmitting and receiving optical signals via multiple channels; and
a wiring board configured to transmit and receive electrical signals to and from the photonic integrated circuit, multiple electrical wirings formed on the wiring board being associated with the multiple channels,
wherein the photonic integrated circuit has a first optical waveguide set extending from an output end of the modulator block to an output port of the photonic integrated circuit, and a second optical waveguide set extending from an input port of the photonic integrated circuit to an input end of the photodetector block,
wherein in the first optical waveguide set and the second optical waveguide set, each of optical waveguides is provided in a shortest path for each of the multiple channels, and,
wherein lengths of the multiple electrical wirings are set so as to compensate for a difference in optical waveguide length among the multiple channels.

2. The optical device as claimed in claim 1, wherein a coupling ratio or a branching ratio of an optical coupler provided in the first optical waveguide set or the second optical waveguide set is offset from an equal ratio so as to compensate for variation in optical loss due to the difference in the optical waveguide length among the multiple channels.

3. The optical device as claimed in claim 2, wherein the optical coupler is provided in the first optical waveguide set and the coupling ratio of the optical coupler is offset from a 50/50 ratio so as to increase a proportion of light traveling through an optical waveguide longer than another optical waveguide in the first optical waveguide set.

4. The optical device as claimed in claim 2, wherein the optical coupler is a polarization coupler provided in the first optical waveguide set and the coupling ratio of the optical coupler is offset from a 50/50 ratio so as to reduce polarization dependent loss of light traveling through an optical waveguide longer than another optical waveguide in the first optical waveguide set.

5. The optical device as claimed in claim 2, wherein the optical coupler is a polarization decoupler provide in the second optical waveguide set and the branching ratio of the optical coupler is offset from a 50/50 ratio so as to reduce polarization dependent loss of light travelling through an optical waveguide longer than another optical waveguide in the second optical waveguide set.

6. The optical device as claimed in claim 2,
wherein the optical coupler is an 90-degree hybrid optical mixer provided in the second optical waveguide set, and the branching ratio of the 90-degree hybrid optical mixer that depends on input optical waveguides of the 90-degree hybrid optical mixer is offset from a 50/50 ratio so as to reduce propagation loss of light travelling through an optical waveguide longer than another optical waveguide in the second optical waveguide set.

7. The optical device as claimed in claim 1,
wherein the wiring board includes an interposer board configured to relay the electrical signals transmitted to and received from the photonic integrated circuit to an exterior of the optical device, and
wherein a center of array of the multiple electrical wirings is offset from a center axis of the interposer board.

8. The optical device as claimed in claim 7,
wherein the wiring board includes a flexible printed circuit board on which the multiple electrical wirings are formed associated with the multiple channels, and
wherein the lengths of the multiple electrical wirings are adjusted in at least one of the interposer board and the flexible printed circuit board so as to compensate for the difference in optical waveguide length among the multiple channels.

9. An optical communication module comprising:
an optical device;
a light source configured to supply a light to the optical device; and
a signal processor configured to process a data signal input to or output from the output device,
wherein the optical device has
a photonic integrated circuit having a modulator block and a photodetector block for transmitting and receiving optical signals via multiple channels, and
a wiring board configured to transmit and receive electrical signals to and from the photonic integrated circuit, multiple electrical wirings formed on the wiring board being associated with the multiple channels,
wherein the photonic integrated circuit has a first optical waveguide set extending from an output end of the modulator block to an output port of the photonic integrated circuit, and a second optical waveguide set extending from an input port of the photonic integrated circuit to an input end of the photodetector block,
wherein in the first optical waveguide set and the second optical waveguide set, each of optical waveguides is provided in a shortest path for each of the multiple channels, and,
wherein lengths of the multiple electrical wirings are set so as to compensate for a difference in optical waveguide length among the multiple channels.

* * * * *